(12) United States Patent
Hu et al.

(10) Patent No.: US 11,773,115 B2
(45) Date of Patent: Oct. 3, 2023

(54) FLAME RETARDANT COMPOUND, METHOD OF MAKING THE SAME, RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Hezong Zhang, Zhongshan (CN)

(73) Assignee: ELITE ELECTRONIC MATERIAL (ZHONGSHAN) CO., LTD., Zhongshan (CN)

( * ) Notice: Subject to any disclaimer, the term of this patent is extended or adjusted under 35 U.S.C. 154(b) by 469 days.

(21) Appl. No.: 17/013,226

(22) Filed: Sep. 4, 2020

(65) Prior Publication Data
US 2022/0024952 A1 Jan. 27, 2022

(30) Foreign Application Priority Data
Jul. 27, 2020 (CN) .......................... 202010730749.7

(51) Int. Cl.
| | |
|---|---|
| *C07F 7/08* | (2006.01) |
| *C08L 71/12* | (2006.01) |
| *C08L 79/08* | (2006.01) |
| *C08K 5/54* | (2006.01) |
| *C08J 5/18* | (2006.01) |
| *C08J 5/24* | (2006.01) |

(52) U.S. Cl.
CPC .......... *C07F 7/0812* (2013.01); *C08K 5/5406* (2013.01); *C08L 71/126* (2013.01); *C08L 79/085* (2013.01); *C08J 5/18* (2013.01); *C08J 5/244* (2021.05); *C08J 2371/12* (2013.01)

(58) Field of Classification Search
CPC ...... C08K 5/54; C08K 5/5419; C08K 5/5406; C08K 5/5425; C07F 9/5325; C07F 9/0812
See application file for complete search history.

(56) References Cited

U.S. PATENT DOCUMENTS

2014/0094620 A1* 4/2014 Yang ...................... C08K 5/549
556/405

FOREIGN PATENT DOCUMENTS

CN 101445520 A * 6/2009

OTHER PUBLICATIONS

Machine translation of CN 101445520 (2009, 4 pages).*

* cited by examiner

*Primary Examiner* — Brieann R Johnston
(74) *Attorney, Agent, or Firm* — Muncy, Geissler, Olds & Lowe, P.C.

(57) ABSTRACT

A compound has a structure of Formula (I) below, wherein E represents a 9,10-dihydro-9-oxa-10-phosphaphenanthrene-10-oxide functional group or a diphenylphosphine oxide functional group. Moreover, a method of making the compound of Formula (I), a resin composition including the compound of Formula (I) and a resin additive and an article made from the resin composition are described. The article includes a prepreg, a resin film, a laminate or a printed circuit board, wherein one or more properties including copper foil peeling strength, Z-axis ratio of thermal expansion, glass transition temperature, flame retardancy, thermal resistance after moisture absorption, dielectric constant, and dissipation factor may be improved.

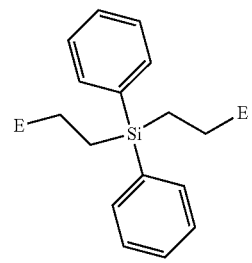

Formula (I)

18 Claims, 2 Drawing Sheets

FLAME RETARDANT COMPOUND, METHOD OF MAKING THE SAME, RESIN COMPOSITION AND ARTICLE MADE THEREFROM

CROSS-REFERENCE TO RELATED APPLICATION

This application claims the priority benefits of China Patent Application No. 202010730749.7, filed on Jul. 27, 2020. The entirety the above-mentioned patent application is hereby incorporated by reference herein and made a part of this specification.

BACKGROUND

1. Field of the Disclosure

The present disclosure primarily relates to a flame retardant compound, a method of making the same, a resin composition and an article made therefrom, more particularly to a flame retardant compound, a method of making the same and a resin composition for the fabrication of a prepreg, a resin film, a laminate (e.g., a copper-clad laminate) and a printed circuit board.

2. Description of Related Art

Recently, the electronic technology has been developed towards high density, lower power consumption and higher performance, thereby presenting more challenges to the high performance electronic materials.

Higher interconnection and integration density per unit area of electronic devices results in greater heat generation during the operation of the devices, which requires higher thermal resistance of the high performance electronic materials including not only glass transition temperature but also thermal resistance after moisture absorption of the materials. To increase the interconnectivity and installation reliability of the electronic devices, the materials need to achieve lower ratio of thermal expansion to ensure higher dimensional stability which is important to the alignment and positioning during the subsequent printed circuit board fabrication. In addition, the materials need to have sufficient adhesion strength to ensure strong connection with the metal traces and prevent failure due to separation of the traces.

Therefore, there is an urgent need to provide a solution for lowering the ratio of thermal expansion of insulation layers without deteriorating other properties, particularly glass transition temperature, copper foil peeling strength, dielectric properties, thermal resistance, etc.

SUMMARY

To overcome the problems of prior arts, particularly one or more above-mentioned technical problems facing conventional materials, it is a primary object of the present disclosure to provide a flame retardant compound and a method of making the same which may overcome at least one of the above-mentioned technical problems. In addition, the present disclosure further provides a resin composition and an article made therefrom which may overcome at least one of the above-mentioned technical problems.

On the other hand, in order to overcome the foregoing disadvantages of prior arts, particularly the deterioration of some properties of insulation material or resin composition, such as ratio of thermal expansion or copper foil peeling strength, caused by using conventional flame retardant materials in the insulation material or resin composition to provide flame retardancy, the present disclosure provides a compound useful in a resin composition to make articles such as a prepreg, a resin film, a laminate and a printed circuit board, thereby improving one or more properties of the articles such as glass transition temperature, Z-axis ratio of thermal expansion, copper foil peeling strength, thermal resistance after moisture absorption, dielectric constant, dissipation factor and flame retardancy.

In one aspect, the present disclosure provides a compound having a structure represented by the following Formula (I):

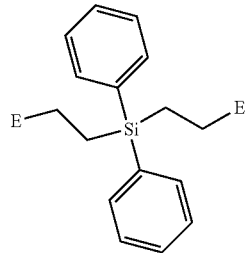

Formula (I)

wherein E represents a 9,10-dihydro-9-oxa-10-phosphaphenanthrene-10-oxide (DOPO) functional group or a diphenylphosphine oxide (DPPO) functional group.

In one embodiment, the compound of Formula (I) has a structure represented by the following Formula (II) or Formula (III):

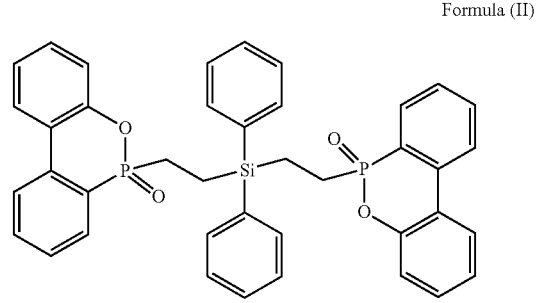

Formula (II)

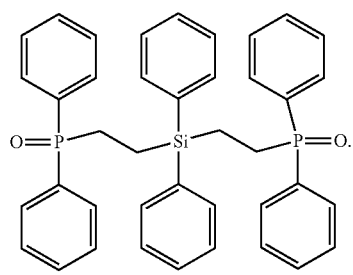

Formula (III)

In another aspect, the present disclosure provides a method of making the compound of Formula (I), comprising: reacting a diphenyldivinylsilane with a 9,10-dihydro-9-oxa-10-phosphaphenanthrene-10-oxide or a diphenylphosphine oxide compound.

In one embodiment, a molar ratio of a reactive functional group of the diphenyldivinylsilane to a reactive functional group of the 9,10-dihydro-9-oxa-10-phosphaphenanthrene-10-oxide or a reactive functional group of the diphenylphosphine oxide compound is between 1:1 and 1:6.

In another aspect, the present disclosure provides a resin composition comprising the compound of Formula (I) and a resin additive.

In one embodiment, the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

In one embodiment, the vinyl-containing resin comprises a vinyl-containing polyphenylene ether resin, a maleimide resin, a maleimide triazine resin, a polyolefin resin, styrene, divinylbenzene, bis(vinylbenzyl) ether, 1,2,4-trivinyl cyclohexane, bis(vinylphenyl)ethane, bis(vinylphenyl)hexane, bis(vinylphenyl) dimethyl ether, bis(vinylphenyl) dimethyl benzene, triallyl isocyanurate, triallyl cyanurate, a prepolymer of any one of the foregoing components or a combination thereof.

In one embodiment, the vinyl-containing polyphenylene ether resin comprises a vinylbenzyl-terminated polyphenylene ether resin, a methacrylate-terminated polyphenylene ether resin or a combination thereof.

In one embodiment, the vinylbenzyl-terminated polyphenylene ether resin and the methacrylate-terminated polyphenylene ether resin respectively comprise a structure of Formula (IV) and a structure of Formula (V):

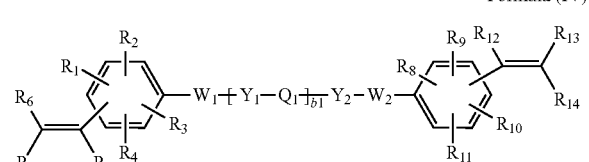

Formula (IV)

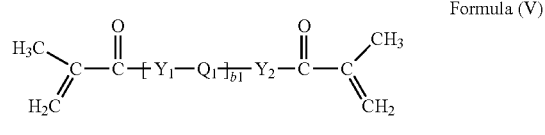

Formula (V)

wherein $R_1$ to $R_{14}$ are individually H or —$CH_3$, and $W_1$ and $W_2$ are individually a $C_1$ to $C_3$ bivalent aliphatic group;
b1 is a natural number of 0 to 8;

$Q_1$ comprises a structure of any one of Formula (B-1) to Formula (B-3) or a combination thereof:

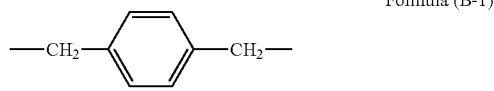

Formula (B-1)

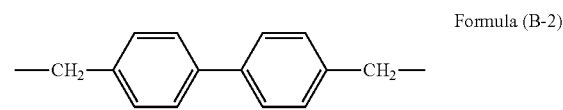

Formula (B-2)

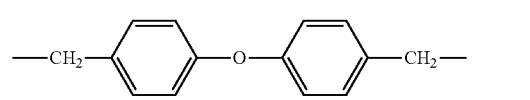

Formula (B-3)

$Y_1$ and $Y_2$ independently comprise a structure of Formula (B-4):

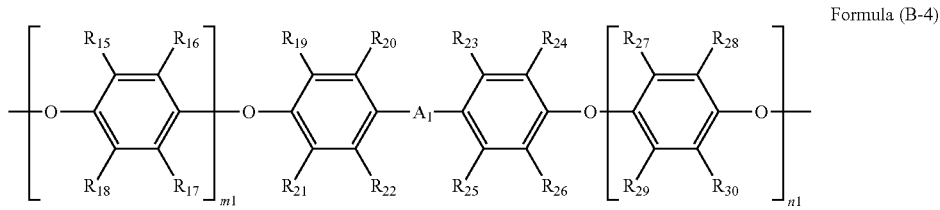

Formula (B-4)

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

In one embodiment, the maleimide resin comprises 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, maleimide resin containing aliphatic long-chain structure or a combination thereof.

In one embodiment, the resin composition comprises 100 parts by weight of a vinyl-containing polyphenylene ether resin, 10 parts by weight to 60 parts by weight of a maleimide resin and 30 parts by weight to 140 parts by weight of the compound of Formula (I).

In one embodiment, the resin composition comprises 100 parts by weight of a vinyl-containing polyphenylene ether resin, 10 parts by weight to 60 parts by weight of a maleimide resin and 50 parts by weight to 120 parts by weight of the compound of Formula (I).

In one embodiment, the resin composition further comprises amine curing agent, flame retardant, inorganic filler, curing accelerator, polymerization inhibitor, coloring agent, solvent, toughening agent, silane coupling agent or a combination thereof.

In another aspect, the present disclosure provides an article made from the resin composition described above, which comprises a prepreg, a resin film, a laminate or a printed circuit board.

In one embodiment, articles made from the resin composition disclosed herein have one, more or all of the following properties:
- a copper foil peeling strength as measured by reference to IPC-TM-650 2.4.8 of greater than or equal to 2.90 lb/in;
- a Z-axis ratio of thermal expansion as measured by reference to IPC-TM-650 2.4.24.5 of less than or equal to 2.90%;
- a glass transition temperature as measured by using dynamic mechanical analysis by reference to IPC-TM-650 2.4.24.4 of greater than or equal to 200° C.;
- a flame retardancy of V-0 or V-1 as measured by reference to UL 94 rating;
- no delamination after subjecting the article to a thermal resistance test after moisture absorption by reference to IPC-TM-650 2.6.16.1 and IPC-TM-650 2.4.23;
- a dielectric constant at 10 GHz as measured by reference to JIS C2565 of less than or equal to 3.60; and
- a dissipation factor at 10 GHz as measured by reference to JIS C2565 of less than or equal to 0.0054.

DESCRIPTION OF THE EMBODIMENTS

Figure 1:
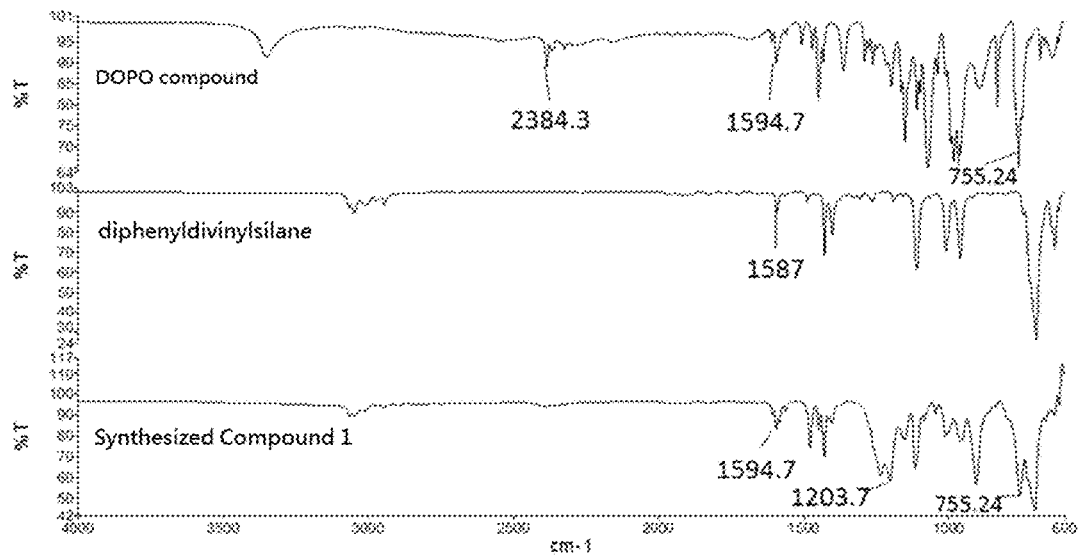
FIG. 1 illustrates the FTIR spectrums of the Synthesized Compound 1 and the raw materials diphenyldivinylsilane and DOPO compound respectively.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having," "encompasses," "encompassing," or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompasses," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

The following embodiments and examples are illustrative in nature and are not intended to limit the present disclosure and its application. In addition, the present disclosure is not bound by any theory described in the background and summary above or the following embodiments or examples.

As used herein, part(s) by weight represents weight part(s) in any weight unit, such as but not limited to kilogram, gram, pound and so on. For example, 100 parts by weight of a vinyl-containing polyphenylene ether resin may represent 100 kilograms of the vinyl-containing polyphenylene ether resin or 100 pounds of the vinyl-containing polyphenylene ether resin.

As used herein, "or a combination thereof" means "or any combination thereof".

Unless otherwise specified, according to the present disclosure, a resin may include a compound and/or a mixture. A compound may include a monomer and/or a polymer. A mixture may include two or more compounds and may include a copolymer or auxiliaries, but not limited thereto.

For example, a compound refers to a chemical substance formed by two or more elements bonded with chemical bonds and may be present as a monomer, a polymer, etc., but not limited thereto. Any compound disclosed herein is interpreted to not only include a single chemical substance but also include a class of chemical substances having the same kind of components or having the same property. In addition, as used herein, a mixture refers to a combination of two or more compounds. A monomer refers to a compound which may participate in a polymerization or prepolymerization reaction to produce a high molecular weight compound. A homopolymer refers to a chemical substance formed by a single compound via polymerization, addition polymerization or condensation polymerization, and a copolymer refers to a chemical substance formed by two or more compounds via polymerization, addition polymerization or condensation polymerization, but not limited thereto. In addition, as used herein, the term "polymer" includes but is not limited to an oligomer. An oligomer refers to a polymer with 2 to 20, typically 2 to 5, repeating units.

As used herein, "vinyl" or "vinyl-containing" refers to the presence of an ethylenic carbon-carbon double bond (C=C) or a functional group derived therefrom in a compound. Therefore, examples of "vinyl" or "vinyl-containing" may include, but not limited to, a structure containing a vinyl group, a vinylene group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, a vinylene group, an allyl group, a vinylbenzyl group, a methacrylate group or the like, but not limited thereto. Unless otherwise specified, "vinyl-containing" refers to the presence of an ethylenic carbon-carbon double bond (C=C) or a functional group derived therefrom in a compound structure, such as, but not limited to, the presence of a vinyl group, a vinylene group, an allyl group, a vinylbenzyl group, a methacrylate group or the like in a compound structure.

As described above, a main object of the present disclosure is to provide a compound having a structure represented by the following Formula (I):

Formula (I)

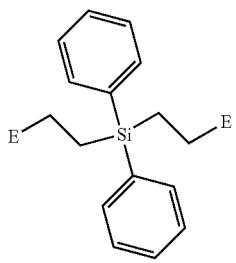

wherein E represents a 9,10-dihydro-9-oxa-10-phosphaphenanthrene-10-oxide functional group or a diphenylphosphine oxide functional group. For example, in one embodiment, both E substituents are a 9,10-dihydro-9-oxa-10-phosphaphenanthrene-10-oxide functional group; for example, in one embodiment, both E substituents are a diphenylphosphine oxide functional group; for example, in one embodiment, one E substituent is a 9,10-dihydro-9-oxa-10-phosphaphenanthrene-10-oxide functional group, and the other E substituent is a diphenylphosphine oxide functional group.

For example, in one embodiment, the compound of Formula (I) has a structure with high symmetry and low polarity, and its does not contain high polarity, water-absorbing functional groups (e.g., a hydroxyl group), thereby providing excellent dielectric properties. When being used in high speed and high frequency signal transmission, the compound of Formula (I) can provide flame retardancy without substantially affecting or worsening the dielectric properties such as Dk and Df of the material.

For example, in one embodiment, compared with known phosphorus-containing siloxane flame retardants, such as conventional phosphorus-containing siloxane flame retardants, the compound of Formula (I) is a pure compound containing phosphorus and silicon atoms; unlike high molecular weight phosphorus-containing siloxane flame retardants, which are usually polymers or mixtures, the compound of Formula (I) is highly compatible with other resins, therefore not causing the problems of poor copper foil peeling strength, thermal resistance or material reliability.

For example, in one embodiment, the compound of Formula (I) has a structure represented by the following Formula (II) or Formula (III):

Formula (II)

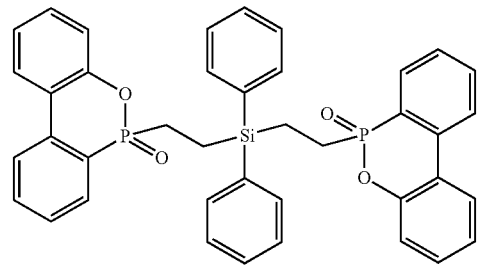

Formula (III)

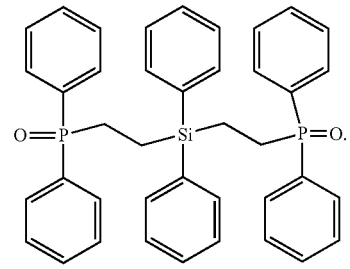

Another main object of the present disclosure is to provide a method of making the compound of Formula (I), which primarily comprises a step of reacting a diphenyldivinylsilane with a 9,10-dihydro-9-oxa-10-phosphaphenanthrene-10-oxide or a diphenylphosphine oxide compound.

For example, the compound of Formula (I) may be obtained by reacting a diphenyldivinylsilane with a 9,10-dihydro-9-oxa-10-phosphaphenanthrene-10-oxide or a diphenylphosphine oxide compound under heating.

For example, in one embodiment, the heating time may range from 1 hour to 10 hours, such as between 2 hours and 10 hours or between 4 hours and 8 hours. The reaction temperature may range from 80° C. to 240° C., such as between 100° C. and 120° C. or between 180° C. and 220° C.

In one embodiment, the amounts of the diphenyldivinylsilane and the 9,10-dihydro-9-oxa-10-phosphaphenanthrene-10-oxide or the diphenylphosphine oxide compound are not particularly limited.

In one embodiment, a molar ratio of a reactive functional group of the diphenyldivinylsilane to a reactive functional group of the 9,10-dihydro-9-oxa-10-phosphaphenanthrene-10-oxide or a reactive functional group of the diphenylphosphine oxide compound is from 1:1 to excess. As used herein, "excess" represents that the molar ratio of the vinyl group in the diphenyldivinylsilane to the phosphorus-containing flame retardant functional group is between 1:1 and 1:6 (mole of reactive functional group=(compound mass/compound molecular weight)*number of reactive functional group in the compound), such as but not limited to 1:1, 1:2, 1:3, 1:4, 1:5, 1:6 and so on. In one embodiment, the molar ratio of the vinyl group in the diphenyldivinylsilane to the phosphorus-containing flame retardant functional group (i.e., —P—H group) is between 1:1 and 1:6. Preferably, the molar ratio of the vinyl group in the diphenyldivinylsilane to the phosphorus-containing flame retardant functional group is between 1:1 and 1:4, more preferably between 1:1.1 and 1:3. In one embodiment, the molar ratio of the vinyl group in the diphenyldivinylsilane to the phosphorus-containing flame retardant functional group in the 9,10-dihydro-9-oxa-10-phosphaphenanthrene-10-oxide is 1:1.1. In one embodiment, the molar ratio of the vinyl group in the diphenyldivinylsilane to the phosphorus-containing flame retardant functional group in the diphenylphosphine oxide compound is 1:2.5.

For example, in one embodiment, during the reaction, a catalyst, a free radical initiator or a combination thereof may be used, such as but not limited to α,α'-bis(tert-butylperoxy-m-isopropyl)benzene, 2,3-dimethyl-2,3-diphenylbutane, 2,5-dimethyl-2,5-di(tert-butylperoxy)-3-hexyne, benzoyl peroxide, 3,3',5,5'-tetramethyl-1,4-diphenoxyquinone, chloroquinone, 2,4,6-tri-tert-butylphenol, tert-butyl peroxyisopropyl carbonate, azobisisobutylonitrile or a combination thereof. In addition, in one embodiment, during the reaction, a metal carboxylate may also be used. The amount of the catalyst, the free radical initiator or a combination thereof may be 0.1% to 1.0% of the amount (in part by weight) of the diphenyldivinylsilane and the 9,10-dihydro-9-oxa-10-phosphaphenanthrene-10-oxide or the diphenylphosphine oxide compound, such as between 0.2% and 1.0% or between 0.5% and 0.8%.

For example, in one embodiment, after the reaction is completed, toluene or xylene may optionally be used as a solvent to wash the crude product to remove byproducts and impurities in the reaction so as to improve the purity of the compound thus made.

In one embodiment, the compounds of Formula (II) and Formula (III) are prepared as follows.

Preparation Example 1

In the presence of nitrogen gas protection, to a three-necked flask, 1.0 mole of diphenyldivinylsilane (containing 2.0 moles of vinyl group) and 2.2 moles of 9,10-dihydro-9-oxa-10-phosphaphenanthrene-10-oxide (DOPO, containing 2.2 moles of phosphorus-containing flame retardant functional group) were added, and the temperature was increased to 100° C. to dissolve the reactants. After the reactants were dissolved and the solution became clear, 0.5% to 1.0% of a free radical initiator (such as 2,3-dimethyl-2,3-diphenylbutane, DMDPB) based on the total amount of the diphenyldivinylsilane and the DOPO compound was added, the temperature was increased to 200° C. or above and the reaction was stirred for 4-8 hours.

After the completion of the reaction, the temperature was lowered to 140° C., a proper amount of toluene was added to the flask, the reaction was further stirred to dissolve unreacted DOPO compound and diphenyldivinylsilane and then cooled, precipitated and filtered to obtain the Synthesized Compound 1 having the structure of Formula (II) with a yield of about 50% to 70%.

FIG. 1 illustrates the FTIR spectrums of the Synthesized Compound 1 (bottom spectrum) and the raw materials diphenyldivinylsilane (middle spectrum) and DOPO compound (top spectrum) respectively.

It can be observed that in the FTIR spectrum of the Synthesized Compound 1 at the bottom, absorption peak of P—H stretch at 2384.3 cm$^{-1}$ was disappeared, indicating that the P—H bond in the DOPO compound was completely reacted; the absorption peak of double bond at 1587 cm$^{-1}$ was disappeared and replaced by a peak at 1594.7 cm$^{-1}$, indicating that the double bond of the diphenyldivinylsilane was reacted with the DOPO compound, and a P=O bond was formed in the Synthesized Compound 1; a new peak at 1203.7 cm$^{-1}$ and the original peak at 755.24 cm$^{-1}$ respectively represent the absorption peak of P—C stretch of the Synthesized Compound 1 and the absorption peak of C—H bending vibration of the DOPO biphenyl group, indicating that in the Synthesized Compound 1, the double bond of the diphenyldivinylsilane and DOPO were reacted and bonded with the DOPO group.

Figure 2:
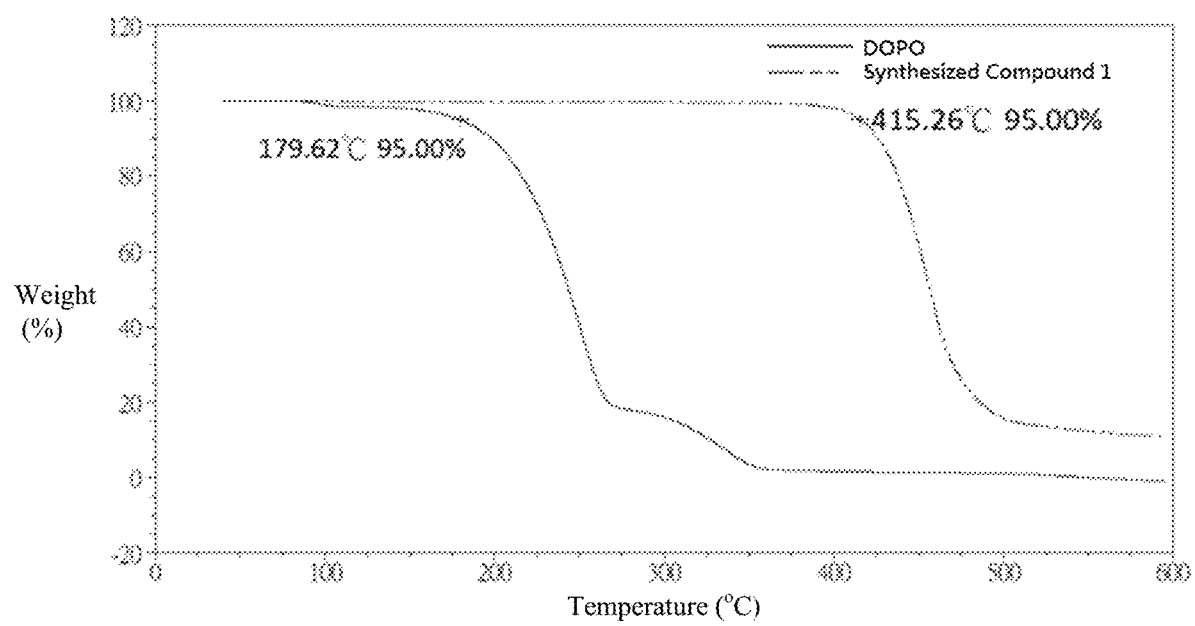
FIG. 2 illustrates the thermal decomposition temperature Td (5%) curves of the Synthesized Compound 1 and the raw material DOPO compound.

FIG. 2 illustrates the thermal decomposition temperature Td (5% weight loss) curves of the Synthesized Compound 1 (having the structure of Formula (II)) and the raw material DOPO compound, wherein the solid line represents that the thermal decomposition temperature of 5% weight loss of the DOPO compound is 179.62° C., and the dashed line represents that the thermal decomposition temperature of 5% weight loss of the Synthesized Compound 1 is 415.26° C.; the raw material diphenyldivinylsilane is in liquid state and therefore could not be measured for its thermal decomposition temperature. As can be observed, the Synthesized Compound 1 has a thermal decomposition temperature apparently higher than that of the raw material DOPO compound.

Figure 3:
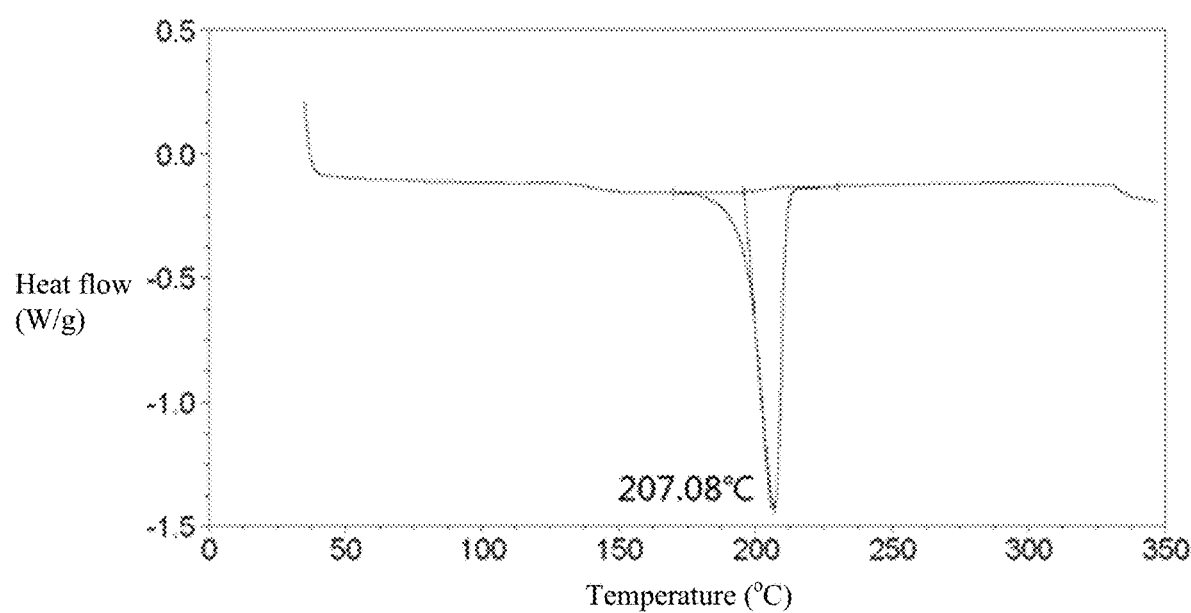
FIG. 3 illustrates the melting point curve of the Synthesized Compound 1.

FIG. 3 illustrates the melting point curve of the Synthesized Compound 1 (having the structure of Formula (II)) as measured by using a differential scanning calorimeter (DSC), showing that the Synthesized Compound 1 has a melting point of 207.08° C. It is known that the DOPO compound (CAS No. 35948-25-5) has a melting point of 119.00° C. Diphenyldivinylsilane is in liquid state and has no melting point. As can be observed, the Synthesized Compound 1 has a melting point apparently higher than that of the raw material DOPO compound.

Preparation Example 2

In the presence of nitrogen gas protection, to a three-necked flask, 1.0 mole of diphenyldivinylsilane (containing 2.0 moles of vinyl group) and 2.2 moles of diphenylphosphine oxide (DPPO, containing 2.2 moles of phosphorus-containing flame retardant functional group) were added, and the temperature was increased to 100° C. to dissolve the reactants. After the reactants were dissolved and the solution became clear, 0.5% to 1.0% of a free radical initiator (such as 2,3-dimethyl-2,3-diphenylbutane, DMDPB) based on the total amount of the diphenyldivinylsilane and the DPPO compound was added, the temperature was increased to 200° C. or above and the reaction was stirred for 4-8 hours.

After the completion of the reaction, the temperature was lowered to 140° C., a proper amount of toluene was added to the flask, the reaction was further stirred to dissolve unreacted DPPO compound and diphenyldivinylsilane and then cooled, precipitated and filtered to obtain the Synthesized Compound 2 having the structure of Formula (III) with a yield of about 50% to 70%.

The compound of Formula (I) as disclosed herein, including but not limited to the compound of Formula (II) or Formula (III), may be used in a resin composition as a flame retardant.

Another main object of the present disclosure is to provide a resin composition comprising the compound of Formula (I) and a resin additive.

According to the present disclosure, the compound of Formula (I) may be used as a flame retardant in a resin composition, and the amount of the compound of Formula (I) is not particularly limited, such as an amount useful for achieving a flame retardancy of V-1 or V-0 according to the UL 94 rating for the resin composition.

Unless otherwise specified, the resin additive used in the resin composition of the present disclosure is not particularly limited and may include various additives or a combination thereof useful for preparing a prepreg, a resin film, a laminate or a printed circuit board.

For example, in one embodiment, the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

For example, in one embodiment, the resin additive comprises a vinyl-containing resin. Examples of the vinyl-containing resin include but are not limited to a resin containing one or more carbon-carbon double bonds. For example, the vinyl-containing resin comprises, but not limited to, a vinyl-containing polyphenylene ether resin, a maleimide resin, a maleimide triazine resin, a polyolefin resin, styrene, divinylbenzene (DVB), bis(vinylbenzyl) ether, 1,2,4-trivinyl cyclohexane (TVCH), bis(vinylphenyl) ethane (BVPE), bis(vinylphenyl)hexane, bis(vinylphenyl) dimethyl ether, bis(vinylphenyl) dimethyl benzene, triallyl isocyanurate (TAIC), and/or triallyl cyanurate (TAC). In one embodiment, the vinyl-containing resin comprises a prepolymer of any one of the foregoing components. In one embodiment, the vinyl-containing resin comprises any one of the foregoing components, a prepolymer of any one of the foregoing components, or a combination thereof.

For example, in one embodiment, the vinyl-containing polyphenylene ether resin used herein refers to a polyphenylene ether compound or mixture having an ethylenic carbon-carbon double bond (C=C) or a functional group derived therefrom. Examples of the ethylenic carbon-carbon double bond (C=C) or the functional group derived therefrom may include, but not limited to, a structure containing a vinyl group, a vinylene group, an allyl group, a vinylbenzyl group, a methacrylate group or the like. Unless otherwise specified, the position of the aforesaid functional group is not particularly limited and may be located at the terminal of a long-chain structure. In other words, the vinyl-containing polyphenylene ether resin described herein represents a polyphenylene ether resin containing a reactive vinyl group or a functional group derived therefrom, examples including but not limited to a polyphenylene ether resin containing a vinyl group, a vinylene group, an allyl group, a vinylbenzyl group, or a methacrylate group.

For example, in one embodiment, the vinyl-containing polyphenylene ether resin described herein comprises a vinylbenzyl-terminated polyphenylene ether resin, a methacrylate-terminated polyphenylene ether resin (i.e., methacryl-terminated polyphenylene ether resin), a chain-extended vinyl-containing polyphenylene ether resin, an allyl-containing polyphenylene ether resin or a combination thereof.

For example, the vinylbenzyl-terminated polyphenylene ether resin and the methacrylate-terminated polyphenylene ether resin respectively comprise a structure of Formula (IV) and a structure of Formula (V):

Formula (IV)

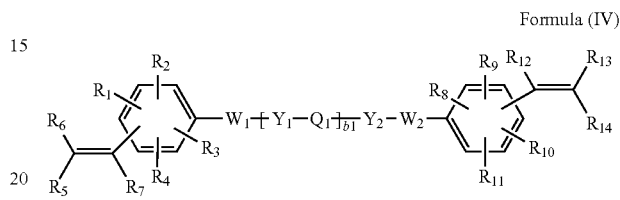

Formula (V)

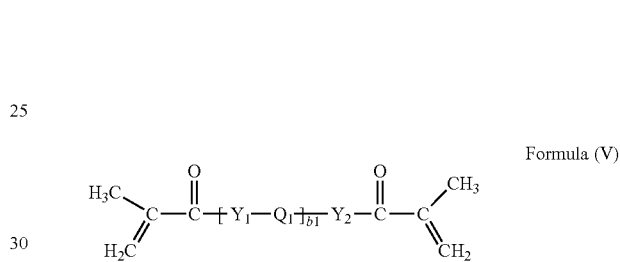

wherein $R_1$ to $R_{14}$ are individually H or —$CH_3$, and $W_1$ and $W_2$ are individually a $C_1$ to $C_3$ bivalent aliphatic group;

b1 is a natural number of 0 to 8;

$Q_1$ comprises a structure of any one of Formula (B-1) to Formula (B-3) or a combination thereof:

Formula (B-1)

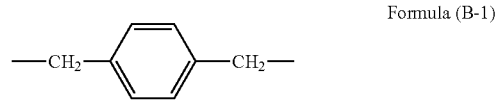

Formula (B-2)

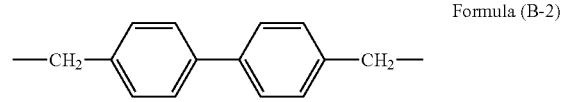

Formula (B-3)

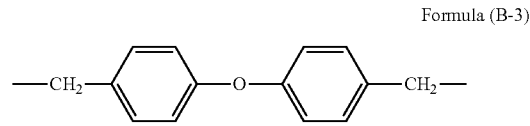

$Y_1$ and $Y_2$ independently comprise a structure of Formula (B-4):

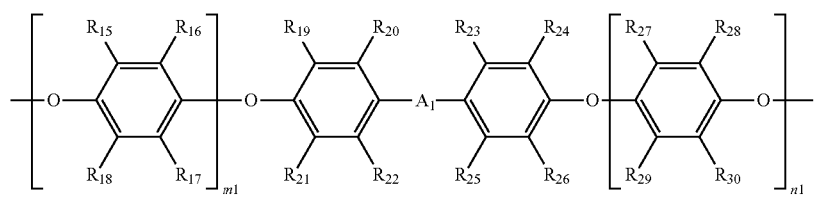

Formula (B-4)

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

For example, the vinyl-containing polyphenylene ether resin may be SA9000 available from Sabic, a vinylbenzyl-containing polyphenylene ether resin with a number average molecular weight of about 1200 (such as OPE-2st 1200, available from Mitsubishi Gas Chemical Co., Inc.), a vinyl-benzyl-containing polyphenylene ether resin with a number average molecular weight of about 2200 (such as OPE-2st 2200, available from Mitsubishi Gas Chemical Co., Inc.), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin used herein refers to a compound or a mixture containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylyl maleimide, N-2,6-xylylmaleimide, N-phenylmaleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

For example, in one embodiment, the styrene maleic anhydride resin used herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, in one embodiment, the polyolefin resin described herein may include any one or more polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, methylstyrene homopolymer, petroleum resin, cycloolefin copolymer and a combination thereof.

For example, in one embodiment, the epoxy resin as used herein may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, in one embodiment, the phenolic resin described herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin or a combination thereof.

For example, in one embodiment, the benzoxazine resin described herein may include bisphenol A benzoxazine resin, bisphenol F benzoxazine resin, phenolphthalein benzoxazine resin, di cyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in one embodiment, the cyanate ester resin described herein may include any known cyanate ester resins used in the art, including but not limited to a cyanate ester resin with an Ar—O—CN structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy available from Lonza.

For example, in one embodiment, the polyester resin described herein may be obtained by esterification of an aromatic compound with two carboxylic groups and an aromatic compound with two hydroxyl groups, such as but not limited to HPC-8000, HPC-8150 or HPC-8200 available from DIC Corporation.

For example, in one embodiment, the polyamide resin described herein may be any polyamide resins known in the field to which this disclosure pertains, including but not limited to various commercially available polyamide resin products.

For example, in one embodiment, the polyimide resin described herein may be any polyimide resins known in the field to which this disclosure pertains, including but not limited to various commercially available polyimide resin products.

For example, in one embodiment, the maleimide triazine resin described in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester and maleimide resin, by polymerizing bisphenol F cyanate ester and maleimide resin, by polymerizing phenol novolac cyanate ester and maleimide resin or by polymerizing dicyclopentadiene-containing cyanate ester and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, when used in combination, the compound of Formula (I) disclosed herein and any one or more resin additives described above may effectively improve one or more properties of the resin composition. For example, the compound of Formula (I) may provide higher copper foil peeling strength, higher glass transition temperature and lower ratio of thermal expansion in various resin systems such as epoxy resin, cyanate ester resin, maleimide resin (BMI), polyphenylene ether resin (PPO), and the like. Preferably, when the compound of Formula (I) is used in conjunction with a double bond containing resin, such as polyphenylene ether resin, maleimide resin, etc., the article made therefrom may achieve a better balance between excellent overall properties and costs.

Unless otherwise specified, the amount or ratio of the compound of Formula (I) and the resin additive is not particularly limited.

For example, in one embodiment, the resin composition comprises 100 parts by weight of a vinyl-containing polyphenylene ether resin, 10 parts by weight to 60 parts by weight of a maleimide resin and 30 parts by weight to 140 parts by weight of the compound of Formula (I). In another embodiment, the resin composition comprises 100 parts by weight of a vinyl-containing polyphenylene ether resin, 10 parts by weight to 60 parts by weight of a maleimide resin and 50 parts by weight to 120 parts by weight of the compound of Formula (I).

In one embodiment, in addition to the compound of Formula (I) and the optional one or more resin additives, the resin composition disclosed herein may further optionally comprise amine curing agent, flame retardant, inorganic filler, curing accelerator, polymerization inhibitor, coloring agent, solvent, toughening agent, silane coupling agent or a combination thereof.

For example, in one embodiment, in addition to the vinyl-containing polyphenylene ether resin, the maleimide resin, and the compound of Formula (I), the resin composition disclosed herein further comprises amine curing agent, flame retardant, inorganic filler, curing accelerator, polymerization inhibitor, coloring agent, solvent, toughening agent, silane coupling agent or a combination thereof.

For example, in one embodiment, the amine curing agent described herein may be dicyandiamide, diamino diphenyl sulfone, diamino diphenyl methane, diamino diphenyl ether, diamino diphenyl sulfide or a combination thereof, but not limited thereto.

For example, in one embodiment, the flame retardant used herein may be any one or more flame retardants useful for preparing a prepreg, a resin film, a laminate or a printed circuit board; examples of the flame retardant include but are not limited to a phosphorus-containing flame retardant, such as any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the flame retardant used herein may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, etc., wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac), etc.

For example, in one embodiment, the inorganic filler used herein may be any one or more fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (A100H), calcined talc, talc, silicon nitride, and calcined kaolin. Moreover, the inorganic filler can be spherical, fibrous, plate-like, particulate, sheet-like or whisker-like and can be optionally pretreated by a silane coupling agent.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl) benzene or a combination thereof.

In one embodiment, for example, the polymerization inhibitor used herein is not particularly limited and may be any polymerization inhibitor known in the field to which this disclosure pertains, including but not limited to various commercially available polymerization inhibitor products. For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methyl ene blue, 4,4'-butylidenebis(6-t-butyl-3-methylphenol), 2,2'-methylenebis(4-ethyl-6-t-butyl phenol) or a combination thereof.

For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include such as 2,2,6,6-tetramethylpiperidine 1-oxyl free radical, 2,2,6,6-tetraethyl piperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

In one embodiment, for example, the coloring agent suitable for the present disclosure may comprise, but not limited to, dye or pigment.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In one embodiment, for example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

In one embodiment, for example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be for example 80° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 150° C. and 220° C. and preferably between 200° C. and 210° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil.

Preferably, the laminate is a copper-clad laminate (CCL).

In addition, the laminate may be further processed by trace formation processes to make a circuit board, such as a printed circuit board.

Preferably, the resin composition of the present disclosure or the article made therefrom may achieve improvement in one or more of the following properties including glass transition temperature, Z-axis ratio of thermal expansion, copper foil peeling strength, thermal resistance after moisture absorption, dielectric constant, dissipation factor and flame retardancy.

For example, the resin composition according to the present disclosure or the article made therefrom may achieve one, more or all of the following properties:
higher glass transition temperature as measured by reference to IPC-TM-650 2.4.24.4, such as a glass transition temperature Tg of greater than or equal to 200° C., such as between 200° C. and 233° C. or between 208° C. and 233° C.; a Z-axis ratio of thermal expansion as measured by reference to IPC-TM-650 2.4.24.5 of less than or equal to 2.90%, such as between 2.10% and 2.90% or between 2.10% and 2.70%;
a copper foil peeling strength as measured by reference to IPC-TM-650 2.4.8 of greater than or equal to 2.90 lb/in, such as between 2.90 lb/in and 3.60 lb/in, between 3.00 lb/in and 3.60 lb/in, or between 3.20 lb/in and 3.60 lb/in; no delamination after subjecting the article to a thermal resistance test after moisture absorption by reference to IPC-TM-650 2.6.16.1 and IPC-TM-650 2.4.23;
a dielectric constant at 10 GHz as measured by reference to JIS C2565 of less than or equal to 3.60, such as between 3.45 and 3.60;
a dissipation factor at 10 GHz as measured by reference to JIS C2565 of less than or equal to 0.0054, such as between 0.0041 and 0.0054; and a flame retardancy as measured by reference to UL 94 rating of V-0 or V-1, such as V-0.

Raw materials below are used to prepare the resin compositions of various Examples and Comparative Examples of the present disclosure according to the amount listed in Table 1 to Table 3 and further fabricated to prepare test samples or articles. Test results of Examples and Comparative Examples are listed in Table 1 to Table 3 below.

SA9000: methacrylate-terminated polyphenylene ether resin, available from Sabic. OPE-2st 2200: vinylbenzyl-terminated polyphenylene ether resin, available from Sabic.

BMI-70: aromatic bismaleimide resin, available from K.I Chemical Industry Co., Ltd.

BMI-2300: phenylmethane maleimide polymer, available from Daiwakasei Industry Co., Ltd.

BMI-80: aromatic bismaleimide resin, available from K.I Chemical Industry Co., Ltd.

TAIC: triallyl isocyanurate, available from Kingyorker Enterprise Co., Ltd.

Synthesized Compound 1: prepared by PREPARATION EXAMPLE 1.

Synthesized Compound 2: prepared by PREPARATION EXAMPLE 2.

Phosphorus-containing Siloxane: as shown in Formula (VI).

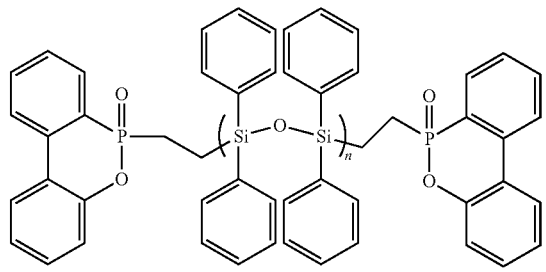

Formula (VI)

Phosphorus-containing Siloxane 1: as shown in Formula (VI), wherein n=1.

Phosphorus-containing Siloxane 2: as shown in Formula (VI), wherein 1<n≤10.

Phosphorus-containing Siloxane 3: as shown in Formula (VI), wherein n>10.

Diphenyldivinylsilane: available from Suzhou Siso New Material Co., Ltd.

DOPO: 9,10-dihydro-9-oxa-10-phosphaphenanthrene-10-oxide, available from

Zhengzhou Alfa Chemical Co., Ltd.

Phosphorus-containing silane coupling agent: as shown in Formula (VII), wherein X is a methoxy group or an ethoxy group.

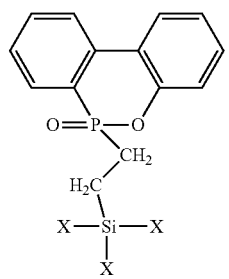

Formula (VII)

SC-2500 SMJ: spherical silica pre-treated by acrylate silane coupling agent, available from Admatechs.

Toluene: available from Chambeco Group.

Methyl ethyl ketone (MEK): source not limited.

25B: peroxide, solid content of 100%, available from NOF Corporation.

Compositions and test results of resin compositions of Examples and Comparative Examples are listed below (in part by weight):

TABLE 1

Resin compositions of Examples (in part by weight) and test results

| Component | | E1 | E2 | E3 | E4 | E5 | E6 | E7 | E8 | E9 | E10 |
|---|---|---|---|---|---|---|---|---|---|---|---|
| polyphenylene ether resin | SA9000 | 100 | 100 | 100 | 100 | 100 | 100 | | 50 | 100 | 100 |
| | OPE-2st 2200 | | | | | | | 100 | 50 | | |
| bismaleimide | BMI-70 | 40 | 40 | 40 | 40 | 40 | 40 | 40 | 40 | 40 | 40 |
| | BMI-2300 | | | | | | | | | | |
| | BMI-80 | | | | | | | | | | |
| crosslinking agent | TAIC | | | | | | | | | 10 | 50 |
| Synthesized Compound | Synthesized Compound 1 | 50 | | 80 | | 120 | | 80 | 80 | 80 | 80 |
| | Synthesized Compound 2 | | 50 | | 80 | | 120 | | | | |
| inorganic filler | SC-2500 SMJ | 100 | 100 | 100 | 100 | 100 | 100 | 100 | 100 | 100 | 100 |
| solvent | MEK | PA | PA | PA | PA | PA | PA | PA | PA | PA | PA |
| | toluene | PA | PA | PA | PA | PA | PA | PA | PA | PA | PA |
| curing accelerator | 25B | 1 | 1 | 1 | 1 | 1 | 1 | 1 | 1 | 1 | 1 |

| Property | Unit | E1 | E2 | E3 | E4 | E5 | E6 | E7 | E8 | E9 | E10 |
|---|---|---|---|---|---|---|---|---|---|---|---|
| glass transition temperature | °C. | 218 | 219 | 216 | 216 | 213 | 214 | 233 | 223 | 210 | 200 |
| ratio of thermal expansion | % | 2.30 | 2.30 | 2.45 | 2.43 | 2.60 | 2.55 | 2.10 | 2.30 | 2.30 | 2.35 |
| copper foil peeling strength | lb/in | 3.50 | 3.50 | 3.30 | 3.35 | 3.20 | 3.20 | 3.60 | 3.40 | 3.20 | 3.00 |
| thermal resistance after moisture absorption | none | pass | pass | pass | pass | pass | pass | pass | pass | pass | pass |
| dielectric constant | none | 3.55 | 3.55 | 3.55 | 3.55 | 3.55 | 3.57 | 3.60 | 3.60 | 3.45 | 3.45 |
| dissipation factor | none | 0.0050 | 0.0050 | 0.0049 | 0.0049 | 0.0048 | 0.0048 | 0.0051 | 0.0050 | 0.0047 | 0.0041 |
| flame retardancy | none | V-0 | V-0 | V-0 | V-0 | V-0 | V-0 | V-0 | V-0 | V-0 | V-0 |

TABLE 2

Resin compositions of Examples (in part by weight) and test results

| Component | | E11 | E12 | E13 | E14 | E15 | E16 | E17 | E18 | E19 |
|---|---|---|---|---|---|---|---|---|---|---|
| polyphenylene ether resin | SA9000 | 100 | 100 | 100 | 100 | 100 | 100 | 100 | 100 | 100 |
| | OPE-2st 2200 | | | | | | | | | |
| bismaleimide | BMI-70 | 10 | 60 | | | 12 | 40 | 40 | 40 | 40 |
| | BMI-2300 | | | 40 | | 20 | | | | |
| | BMI-80 | | | | 40 | 8 | | | | |
| crosslinking agent | TAIC | | | | | | | | | |
| Synthesized Compound | Synthesized Compound 1 | 80 | 80 | 80 | 80 | 40 | 30 | 140 | | |
| | Synthesized Compound 2 | | | | | 40 | | | 30 | 140 |
| inorganic filler | SC-2500 SMJ | 100 | 100 | 100 | 100 | 140 | 100 | 100 | 100 | 100 |
| solvent | MEK | PA | PA | PA | PA | PA | PA | PA | PA | PA |
| | toluene | PA | PA | PA | PA | PA | PA | PA | PA | PA |
| curing accelerator | 25B | 1 | 1 | 1 | 1 | 1.6 | 1 | 1 | 1 | 1 |

TABLE 2-continued

Resin compositions of Examples (in part by weight) and test results

| Property | Unit | E11 | E12 | E13 | E14 | E15 | E16 | E17 | E18 | E19 |
|---|---|---|---|---|---|---|---|---|---|---|
| glass transition temperature | °C. | 208 | 233 | 213 | 210 | 215 | 220 | 209 | 221 | 209 |
| ratio of thermal expansion | % | 2.70 | 2.10 | 2.55 | 2.60 | 2.20 | 2.35 | 2.90 | 2.25 | 2.85 |
| copper foil peeling strength | lb/in | 3.20 | 3.45 | 3.25 | 3.30 | 3.40 | 3.50 | 2.90 | 3.45 | 2.95 |
| thermal resistance after moisture absorption | none | pass | pass | pass | pass | pass | pass | pass | pass | pass |
| dielectric constant | none | 3.50 | 3.60 | 3.50 | 3.55 | 3.55 | 3.55 | 3.55 | 3.55 | 3.55 |
| dissipation factor | none | 0.0046 | 0.0054 | 0.0048 | 0.0049 | 0.0046 | 0.0051 | 0.0048 | 0.0051 | 0.0048 |
| flame retardancy | none | V-0 | V-0 | V-0 | V-0 | V-0 | V-1 | V-0 | V-1 | V-0 |

TABLE 3

Resin compositions of Comparative Examples (in part by weight) and test results

| | Component | C1 | C2 | C3 | C4 | C5 | C6 | C7 |
|---|---|---|---|---|---|---|---|---|
| polyphenylene ether resin | SA9000 | 100 | 100 | 100 | 100 | 100 | 100 | 100 |
| | OPE-2st 2200 | | | | | | | |
| bismaleimide | BMI-70 | | 40 | 40 | 40 | 40 | 40 | 40 |
| Phosphorus-containing Siloxane | Phosphorus-containing Siloxane 1 | 80 | | | | | | |
| | Phosphorus-containing Siloxane 2 | | 80 | | | | | |
| | Phosphorus-containing Siloxane 3 | | | 80 | | | | |
| silicon-containing compound | diphenyldivinylsilane | | | | 80 | | | 26 |
| DOPO | DOPO | | | | | 80 | | 54 |
| silane coupling agent | phosphorus-containing silane coupling agent | | | | | | 80 | |
| inorganic filler | SC-2500 SMJ | | 100 | 100 | 100 | 100 | 100 | 100 |
| solvent | MEK | PA | PA | PA | PA | PA | PA | PA |
| | toluene | PA | PA | PA | PA | PA | PA | PA |
| curing accelerator | 25B | | 1 | 1 | 1 | 1 | 1 | 1 |

| Property | Unit | C1 | C2 | C3 | C4 | C5 | C6 | C7 |
|---|---|---|---|---|---|---|---|---|
| glass transition temperature | °C. | 205 | 200 | 193 | 188 | 188 | 178 | 186 |
| ratio of thermal expansion | % | 3.00 | 3.10 | 4.10 | 4.00 | 4.20 | 4.60 | 4.20 |
| copper foil peeling strength | lb/in | 2.70 | 2.50 | 1.70 | 2.50 | 3.00 | 3.20 | 2.70 |
| thermal resistance after moisture absorption | none | pass | fail | fail | pass | fail | fail | fail |
| dielectric constant | none | 3.70 | 3.75 | 3.85 | 3.50 | 3.90 | 3.70 | 3.70 |
| dissipation factor | none | 0.0060 | 0.0065 | 0.0077 | 0.0043 | 0.0085 | 0.0067 | 0.0065 |
| flame retardancy | none | V-0 | V-0 | V-1 | V-2 | V-0 | V-2 | V-1 |

Resin compositions from Table 1 to Table 3 were used to make varnishes and various samples (specimens) as described below and tested under conditions specified below so as to obtain the test results in Table 1 to Table 3.

Varnish

Components of the resin composition from each Example (abbreviated as E, such as E1 to E19) or Comparative Example (abbreviated as C, such as C1 to C7) were added to a stirrer according to the amounts listed in Tables 1-3 for stirring and well-mixing to form a resin varnish.

For example, in Example E1, 100 parts by weight of a vinyl-containing polyphenylene ether resin (SA9000), 40 parts by weight of an aromatic maleimide resin (BMI-70) and 50 parts by weight of the Synthesized Compound 1 (having a structure of Formula (II)) were added to a stirrer containing a proper amount of toluene and a proper amount of methyl ethyl ketone (i.e., a proper amount (abbreviated as "PA") in Tables 1-3 represents an amount of solvent suitable for obtaining a desired solid content for the resin composition, such as a solid content of the varnish being 65 wt %), and the solution was mixed and stirred to fully dissolve the solid ingredients to form a homogeneous liquid state. Then 100 parts by weight of spherical silica (SC-2500 SMJ) were added and well dispersed, followed by adding 1 part by weight of a curing accelerator (25B, pre-dissolved by a proper amount of solvent) and stirring for 1 hour to obtain the varnish of resin composition E1.

In addition, according to the components and amounts listed in Table 1 to Table 3 above, varnishes of Examples E2 to E19 and Comparative Examples C1 to C7 were prepared following the preparation process of the varnish of Example E1.

Prepreg (Using 2116 E-Glass Fiber Fabric)

Resin compositions from different Examples (E1 to E19) and Comparative Examples (C1 to C7) listed in Table 1 to Table 3 were respectively added to a stirred tank, well mixed and fully dissolved as varnishes and then added to an impregnation tank. A fiberglass fabric (e.g., 2116 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Prepreg (Using 1080 E-Glass Fiber Fabric)

Resin compositions from different Examples (E1 to E19) and Comparative Examples (C1 to C7) listed in Table 1 to Table 3 were respectively added to a stirred tank, well mixed and fully dissolved as varnishes and then added to an impregnation tank. A fiberglass fabric (e.g., 1080 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 70%).

Copper-Clad Laminate (Obtained by Laminating Eight Prepregs)

Two 18 μm hyper very low profile 2 copper foils (HVLP2 copper foils) and eight prepregs made from each resin composition (using 2116 E-glass fiber fabric) were prepared batchwise. Each prepreg has a resin content of about 52%. A copper foil, eight prepregs and a copper foil were superimposed in such order and then subject to a vacuum condition for lamination at 200° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate was etched to remove the two copper foils to obtain a copper-free laminate sample made from laminating eight prepregs, and each copper-free laminate had a resin content of about 52%.

Copper-Free Laminate (Obtained by Laminating Two Prepregs)

Two 18 μm hyper very low profile 2 copper foils (HVLP2 copper foils) and two prepregs made from each resin composition (using 1080 E-glass fiber fabric) were prepared batchwise. Each prepreg has a resin content of about 70%. A copper foil, two prepregs and a copper foil were superimposed in such order and then subject to a vacuum condition for lamination at 200° C. for 2 hours to form each copper-clad laminate, which was then subject to an etching process to remove the copper foils on both sides to obtain a copper-free laminate sample. Insulation layers were formed by curing (C-stage) two sheets of superimposed prepreg between the two copper foils, and the resin content of the insulation layers was about 70%.

Test items and test methods are described below.

1. Glass Transition Temperature (Tg)

A copper-free laminate (obtained by laminating eight prepregs) sample was subject to glass transition temperature measurement by using the dynamic mechanical analysis (DMA) method. Each sample was heated from 35° C. to 300° C. at a heating rate of 2° C./minute and then subject to the measurement of glass transition temperature (° C.) by reference to the method described in IPC-TM-650 2.4.24.4.

For example, articles made from the resin composition disclosed herein has a high glass transition temperature as measured by reference to IPC-TM-650 2.4.24.4, such as a glass transition temperature Tg of greater than or equal to 200° C., such as between 200° C. and 233° C.

2. Ratio of Thermal Expansion

A copper-free laminate sample (obtained by laminating eight prepregs) was subject to thermal mechanical analysis (TMA) during the measurement of ratio of thermal expansion (i.e., ratio of dimensional change). Each sample was heated from 35° C. to 265° C. at a heating rate of 10° C./minute and then subject to the measurement of dimensional change (%) between 50° C. and 260° C. in Z-axis by reference to the method described in IPC-TM-650 2.4.24.5, wherein lower dimensional change percentage is more preferred.

In general, high ratio of thermal expansion in Z-axis indicates high ratio of dimensional change, and copper-clad laminates with high ratio of dimensional change may result in reliability problems such as delamination during printed circuit board fabrication. In the present technical field, lower ratio of thermal expansion is more preferred, and a difference in ratio of thermal expansion of greater than or equal to 0.1% represents a significant difference.

For example, articles made from the resin composition disclosed herein are characterized by a ratio of thermal expansion as measured by reference to IPC-TM-650 2.4.24.5 of less than or equal to 2.90%, such as less than or equal to 2.10%, 2.15%, 2.20%, 2.25%, 2.30%, 2.35%, 2.40%, 2.43%, 2.45%, 2.50%, 2.55%, 2.60%, 2.65%, 2.70%, 2.75%, 2.80%, 2.85% or 2.90%, such as between 2.10% and 2.90% or between 2.10% and 2.70%.

3. Copper Foil Peeling Strength (Peel Strength, P/S)

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface. A higher copper foil peeling strength is more preferred, and a difference in copper foil peeling strength of greater than or equal to 0.1 lb/in represents a significant difference.

For example, articles made from the resin composition disclosed herein have a copper foil peeling strength as measured by reference to IPC-TM-650 2.4.8 of greater than or equal to 2.90 lb/in, preferably greater than or equal to 2.90 lb/in, 2.95 lb/in, 3.00 lb/in, 3.10 lb/in, 3.20 lb/in, 3.25 lb/in, 3.30 lb/in, 3.35 lb/in, 3.40 lb/in, 3.45 lb/in, 3.50 lb/in, 3.55 lb/in or 3.60 lb/in, such as between 2.90 lb/in and 3.60 lb/in, between 3.00 lb/in and 3.60 lb/in, or between 3.20 lb/in and 3.60 lb/in.

4. Thermal Resistance after Moisture Absorption (PCT)

A copper-free laminate sample (obtained by laminating eight prepregs) was subject to pressure cooking test (PCT) by reference to IPC-TM-650 2.6.16.1 and five hours of moisture absorption (testing temperature of 121° C., relative humidity of 100%), and then by reference to IPC-TM-650 2.4.23, the sample after moisture absorption was immersed into a 288° C. solder bath for 20 seconds, removed and then inspected to determine the absence or presence of delamination, such as whether interlayer delamination or blistering occurs between insulation layers. Interlayer delamination or blistering may occur between any layers of the laminate.

For example, articles made from the resin composition disclosed herein are characterized by no delamination in a thermal resistance test after moisture absorption by reference to IPC-TM-650 2.6.16.1 and IPC-TM-650 2.4.23. Absence of delamination is designated as "pass", and occurrence of delamination is designated as "fail".

5. Dielectric Constant (Dk) and Dissipation Factor (Df)

In the measurement of dielectric constant and dissipation factor, a copper-free laminate sample (obtained by laminating two prepregs) was tested by using a microwave dielectrometer available from AET Corp. by reference to JIS C2565 at 10 GHz for analyzing each sample. Lower dielectric constant or lower dissipation factor represents better dielectric properties of the sample.

Under a 10 GHz frequency, for a Dk value of less than or equal to 3.60 and a Df value of less than or equal to 0.005, a difference in Dk value of greater than or equal to 0.05 represents substantial difference (i.e., significant technical difficulty) in dielectric constant of different laminates, and a difference in Dk value of less than 0.05 represents no substantial difference in dielectric constant of different laminates; a difference in Df value of less than 0.0001 represents no substantial difference in dissipation factor of different laminates, and a difference in Df value of greater than or equal to 0.0001 represents a substantial difference (i.e., significant technical difficulty) in dissipation factor of different laminates. For a Df value of greater than 0.005, a difference in Df value of less than 0.0003 represents no substantial difference in dissipation factor of different laminates, and a difference in Df value of greater than or equal to 0.0003 represents a substantial difference (i.e., significant technical difficulty) in dissipation factor of different laminates.

For example, articles made from the resin composition disclosed herein, as measured by reference to JIS C2565 at 10 GHz, have a dielectric constant of less than or equal to 3.60, such as between 3.45 and 3.60, and a dissipation factor of less than or equal to 0.0054, such as between 0.0041 and 0.0054.

6. Flame Retardancy

A copper-free laminate sample (obtained by laminating eight prepregs) was used in the flame retardancy test. The flame retardancy test was performed in accordance with the UL 94 rating, and the results were represented by V-0, V-1, or V-2, wherein V-0 indicates a superior flame retardancy to V-1, and V-1 indicates a superior flame retardancy to V-2.

For example, articles made from the resin composition disclosed herein have a flame retardancy of V-0 or V-1 as measured by reference to UL 94 rating, such as V-0. In addition, according to the test results disclosed above, the compound of Formula (I) of the present disclosure, as a flame retardant, may achieve V-0 or V-1 flame retardancy.

The following observations can be made by comparing the compound of Formula (I) of the present disclosure with the phosphorus-containing siloxane of Formula (VI), such as Phosphorus-containing Siloxane 1, Phosphorus-containing Siloxane 2 or Phosphorus-containing Siloxane 3 when n=1, 1<n≤10 or n>10 in Formula (VI), or by comparing the compound of Formula (I) of the present disclosure with the phosphorus-containing silane coupling agent of Formula (VII).

The compound of Formula (I) has a structure of Formula (II) when E represents a 9,10-dihydro-9-oxa-10-phosphaphenanthrene-10-oxide functional group. In this situation, structural analysis of the aforesaid various phosphorus-containing and silicon-containing substances reveals that Phosphorus-containing Siloxane 1 (i.e., n=1 in Formula (VI)) is closest to the compound of Formula (II), and the difference therebetween is that the compound of Formula (II) contains only one silicon atom and does not contain a Si—O bond.

Side-by-side comparison of Example E3 and Comparative Example C1 shows that, by using the compound of Formula (II) according to the present disclosure, in contrast to Phosphorus-containing Siloxane 1, articles made therefrom achieve significant improvements in glass transition temperature, Z-axis ratio of thermal expansion, copper foil peeling strength, dielectric constant and dissipation factor.

The compound of Formula (I) has a structure of Formula (III) when E represents a diphenylphosphine oxide functional group, which is similarly closest to Phosphorus-containing Siloxane 1, and the difference therebetween is that the compound of Formula (III) contains only one silicon atom, does not contain a Si—O bond, and contains diphenylphosphine oxide instead of 9,10-dihydro-9-oxa-10-phosphaphenanthrene-10-oxide as the flame retardant group.

Side-by-side comparison of Example E4 and Comparative Example C1 shows that, by using the compound of Formula (III) according to the present disclosure, in contrast to Phosphorus-containing Siloxane 1, articles made therefrom achieve significant improvements in glass transition temperature, Z-axis ratio of thermal expansion, copper foil peeling strength, dielectric constant and dissipation factor.

In addition, side-by-side comparison of Examples E3 and E4 with Comparative Examples C2, C3 and C6 respectively, it is found that the compound of Formula (II) or Formula (III) may achieve improvements in one, more or all properties including glass transition temperature, Z-axis ratio of thermal expansion, copper foil peeling strength, thermal resistance after moisture absorption, dielectric constant and dissipation factor.

Moreover, side-by-side comparison of the compound of Formula (I) with the raw material diphenyldivinylsilane or 9,10-dihydro-9-oxa-10-phosphaphenanthrene-10-oxide (DOPO) shows that articles made from the compound of Formula (II) or Formula (III) may achieve improvements in one, more or all properties including glass transition temperature, Z-axis ratio of thermal expansion, copper foil peeling strength, thermal resistance after moisture absorption, dielectric constant and dissipation factor.

By the comparison of all Examples E1-E19 with all Comparative Examples C1-C7, it is confirmed that substrates made from using the compound of Formula (I) disclosed herein may achieve at the same time one, more or all properties including a glass transition temperature of greater than or equal to 200° C., a copper foil peeling strength of greater than or equal to 2.90 lb/in, a Z-axis ratio of thermal expansion of less than or equal to 2.90% and a flame retardancy of V-0 or V-1 rating. In contrast, Comparative Examples C1-C7 not using the technical solution of the present disclosure fail to achieve the aforesaid technical effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A compound having a structure represented by the following Formula (I):

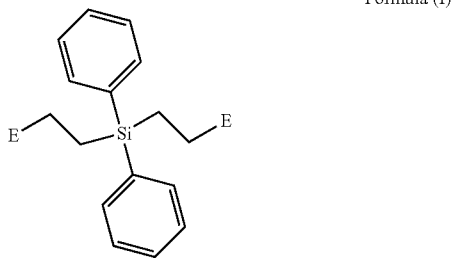

Formula (I)

wherein E is independently represented by a 9,10-dihydro-9-oxa-10-phosphaphenanthrene-10-oxide functional group or a diphenylphosphine oxide functional group.

2. The compound of claim 1, which has a structure represented by the following Formula (II) or Formula (III):

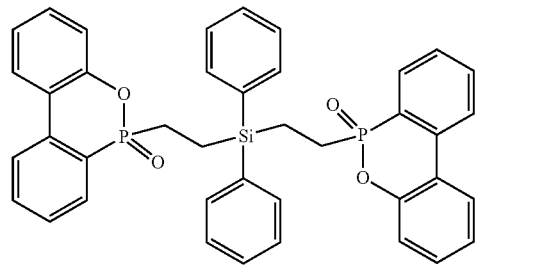

Formula (II)

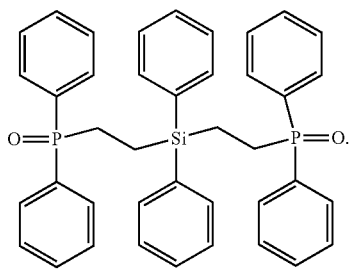

Formula (III)

3. A method of making the compound of claim 1, comprising: reacting a diphenyldivinylsilane with a 9,10-dihydro-9-oxa-10-phosphaphenanthrene-10-oxide or a diphenylphosphine oxide compound.

4. The method of claim 3, wherein a molar ratio of a reactive functional group of the diphenyldivinylsilane to a reactive functional group of the 9,10-dihydro-9-oxa-10-phosphaphenanthrene-10-oxide or a reactive functional group of the diphenylphosphine oxide compound is between 1:1 and 1:6.

5. A resin composition comprising the compound of Formula (I) as claimed in claim 1 and a resin additive.

6. The resin composition of claim 5, wherein the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

7. The resin composition of claim 6, wherein the vinyl-containing resin is selected from the group consisting of a vinyl-containing polyphenylene ether resin, a maleimide resin, a maleimide triazine resin, a polyolefin resin, styrene, divinylbenzene, bis(vinylbenzyl) ether, 1,2,4-trivinyl cyclohexane, bis(vinylphenyl)ethane, bis(vinylphenyl)hexane, bis(vinylphenyl) dimethyl ether, bis(vinylphenyl) dimethyl benzene, triallyl isocyanurate, triallyl cyanurate, a prepolymer thereof and a combination thereof.

8. The resin composition of claim 7, wherein the vinyl-containing polyphenylene ether resin is selected from the group consisting of a vinylbenzyl-terminated polyphenylene ether resin, a methacrylate-terminated polyphenylene ether resin and a combination thereof.

9. The resin composition of claim 8, wherein the vinylbenzyl-terminated polyphenylene ether resin and the methacrylate-terminated polyphenylene ether resin respectively comprise a structure of Formula (IV) and a structure of Formula (V):

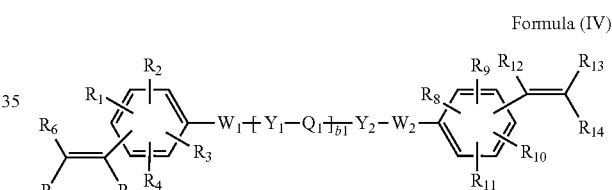

Formula (IV)

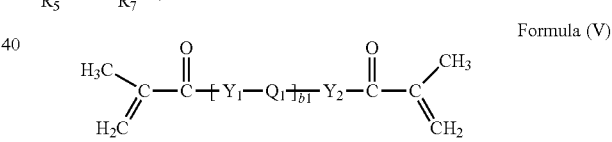

Formula (V)

wherein $R_1$ to $R_{14}$ are individually H or —$CH_3$, and $W_1$ and $W_2$ are individually a $C_1$ to $C_3$ bivalent aliphatic group;

b1 is a natural number of 0 to 8;

$Q_1$ comprises a structure of any one of Formula (B-1) to Formula (B-3) or a combination thereof:

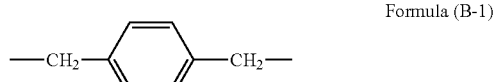

Formula (B-1)

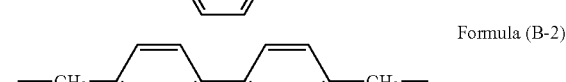

Formula (B-2)

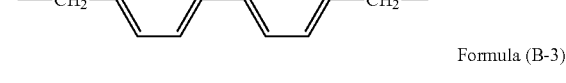

Formula (B-3)

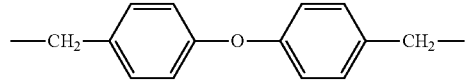

$Y_1$ and $Y_2$ independently comprise a structure of Formula (B-4):

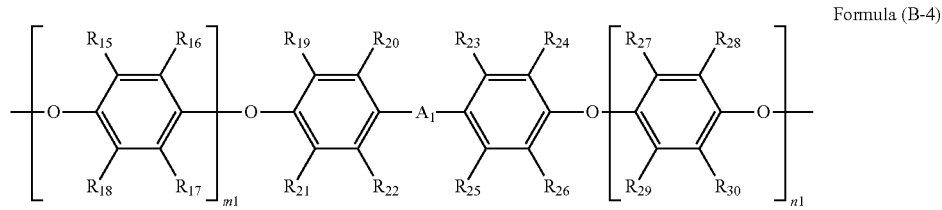

Formula (B-4)

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

10. The resin composition of claim 7, wherein the maleimide resin is selected from the group consisting of 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bis-maleimide, 1,6-bismaleimide-(2,2,4-trimethyl)hexane, N-2,3-xylyl maleimide, N-2,6-xylylmaleimide, N-phenylmaleimide, maleimide resin containing aliphatic long-chain structure and a combination thereof.

11. The resin composition of claim 7, comprising 10 parts by weight to 60 parts by weight of the maleimide resin and 30 parts by weight to 140 parts by weight of the compound of Formula (I) relative to 100 parts by weight of the vinyl-containing polyphenylene ether resin.

12. The resin composition of claim 7, comprising 10 parts by weight to 60 parts by weight of the maleimide resin and 50 parts by weight to 120 parts by weight of the compound of Formula (I) relative to 100 parts by weight of the vinyl-containing polyphenylene ether resin.

13. The resin composition of claim 5, further comprising amine curing agent, flame retardant, inorganic filler, curing accelerator, polymerization inhibitor, coloring agent, solvent, toughening agent, silane coupling agent or a combination thereof.

14. An article made from the resin composition of claim 5, comprising a prepreg, a resin film, a laminate or a printed circuit board.

15. The article of claim 14, having a copper foil peeling strength as measured by reference to IPC-TM-650 2.4.8 of greater than or equal to 2.90 lb/in.

16. The article of claim 14, having a Z-axis ratio of thermal expansion as measured by reference to IPC-TM-650 2.4.24.5 of less than or equal to 2.90%.

17. The article of claim 14, having a glass transition temperature as measured by using dynamic mechanical analysis by reference to IPC-TM-650 2.4.24.4 of greater than or equal to 200° C.

18. The article of claim 14, having a flame retardancy of V-0 or V-1 as measured by reference to UL 94 rating.

* * * * *